(12) United States Patent
Li (10) Patent No.: US 11,010,079 B2
(45) Date of Patent: May 18, 2021

(54) CONCEPT FOR STORING FILE SYSTEM METADATA WITHIN SOLID-STAGE STORAGE DEVICES

(71) Applicant: Intel Corporation, Santa Clara, CA (US)

(72) Inventor: Peng Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 16/378,606

(22) Filed: Apr. 9, 2019

(65) Prior Publication Data

US 2019/0235779 A1 Aug. 1, 2019

(51) Int. Cl.
*G06F 3/06* (2006.01)
*G06F 16/14* (2019.01)

(52) U.S. Cl.
CPC .......... *G06F 3/0643* (2013.01); *G06F 3/0604* (2013.01); *G06F 3/064* (2013.01); *G06F 3/0658* (2013.01); *G06F 3/0673* (2013.01); *G06F 16/14* (2019.01)

(58) Field of Classification Search
None
See application file for complete search history.

(56) References Cited

U.S. PATENT DOCUMENTS

| 10,078,453 | B1 | 9/2018 | Li | |
|---|---|---|---|---|
| 2013/0332694 | A1* | 12/2013 | Reissner | G06F 3/067 711/172 |
| 2016/0054931 | A1* | 2/2016 | Romanovsky | G06F 3/0608 711/103 |
| 2017/0315729 | A1* | 11/2017 | Herrell | G06F 3/0679 |
| 2018/0089076 | A1* | 3/2018 | Li | G06F 12/0246 |

(Continued)

OTHER PUBLICATIONS

E2fsprogs open-source file system utilities found at https://github.com/tytso/e2fsprogs (Table of Contents printout provided).

(Continued)

*Primary Examiner* — Tracy C Chan
(74) *Attorney, Agent, or Firm* — 2SPL Patent Attorneys PartG mbB; Yong Beom Hwang (57) ABSTRACT

Examples relate to a controller apparatus or controller device for a solid-stage storage device, to an apparatus or device for a host computer, to corresponding methods and computer programs, to a solid-stage storage device and to a host computer comprising a solid-state storage device. Examples provide a controller apparatus for a solid-state storage device. The solid-state storage device comprises non-volatile buffer memory circuitry and storage circuitry. The controller apparatus comprises interface circuitry for communicating with a host computer. The controller apparatus comprises processing circuitry configured to obtain a control instruction related to a file system of a partition from the host computer. The partition is at least partially stored within the storage circuitry of the solid-state storage device. The control instruction indicates a location of file system metadata within the partition. The processing circuitry is configured to store the file system metadata within the non-volatile buffer memory circuitry of the solid-state storage device based on the location of the file system metadata.

19 Claims, 3 Drawing Sheets

(56) References Cited

U.S. PATENT DOCUMENTS

2019/0042113 A1  2/2019  Li
2019/0042152 A1  2/2019  Trika
2019/0042153 A1  2/2019  Khan

OTHER PUBLICATIONS

Unpublished U.S. Appl. No. 15/939,398 to Inventor Trika filed Mar. 29, 2018.

* cited by examiner

CONCEPT FOR STORING FILE SYSTEM METADATA WITHIN SOLID-STAGE STORAGE DEVICES

FIELD

Examples relate to a controller apparatus or controller device for a solid-stage storage device, to an apparatus or device for a host computer, to corresponding methods and computer programs, to a solid-stage storage device and to a host computer comprising a solid-state storage device.

BACKGROUND

Solid-state storage is a type of computer-accessible storage that is based on electronically storing information within microchips. A common type of solid-state storage is so-called flash memory, which is a non-volatile computer storage medium that can be electrically erased and reprogrammed.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
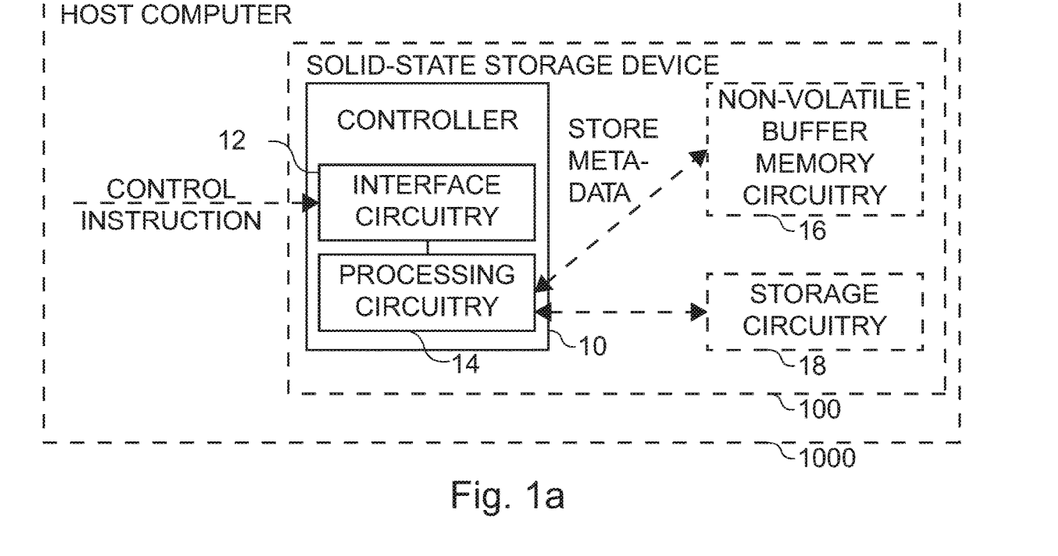
FIG. 1a shows a block diagram of an example of a controller apparatus or controller device for a solid-state storage device, of a solid-state storage device comprising non-volatile buffer memory circuitry, storage circuitry, and a controller apparatus or controller device, and of a host computer comprising a solid-state storage device.

FIG. 1a shows a block diagram of an example of a controller apparatus 10 or a controller device 10 for a solid-state storage device 100. The components of the controller device 10 are defined as component means, which correspond to the respective structural components of the controller apparatus 10. The solid-state storage device 100 comprises non-volatile buffer memory circuitry 16 and storage circuitry 18. The controller apparatus 10 comprises interface circuitry 12 (i.e. means for communicating 12) for communicating with a host computer 1000. The controller apparatus 10 further comprises processing circuitry 14 (i.e. means for processing) that is coupled to the interface circuitry 12. The processing circuitry 14 is configured to obtain (i.e. receive) a control instruction related to a file system of a partition from the host computer. The partition is at least partially stored within the storage circuitry 18 of the solid-state storage device 100. The control instruction indicates a location of file system metadata within the partition. The processing circuitry 14 is configured to store the file system metadata within the non-volatile buffer memory circuitry 16 of the solid-state storage device 100 based on the location of the file system metadata.

FIG. 1a further shows the solid-state storage device 100 comprising the controller apparatus 10 or controller device 10, the non-volatile buffer memory circuitry 16 and the storage circuitry 18. FIG. 1a further shows the host computer 1000 comprising the solid-state storage device 100.

Figure 1B:
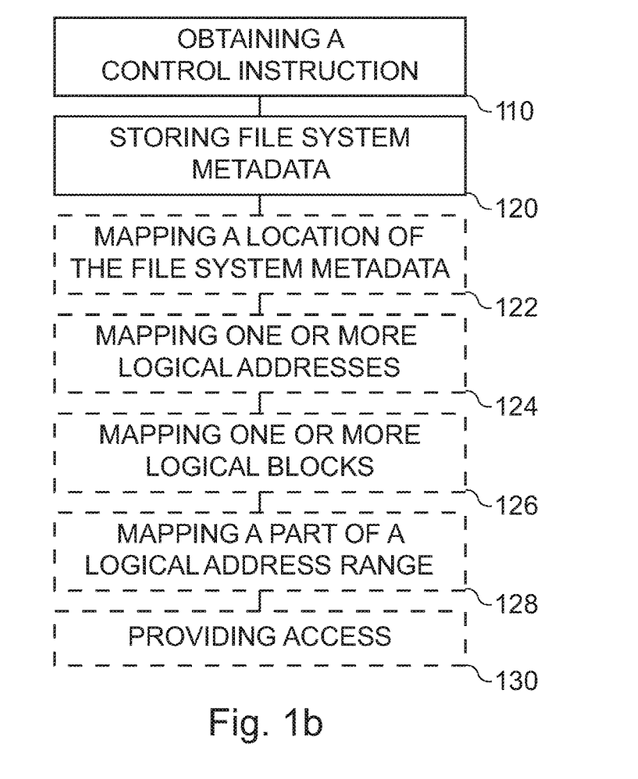
FIG. 1b shows a flow chart of an example of a controller method for a solid-state storage device.

FIG. 1b shows a flow chart of an example of a (corresponding) controller method for the solid-state storage device 100. The controller method comprises obtaining (i.e. receiving) 110 the control instruction from the host computer 1000. The controller method comprises storing 120 the file system metadata within the non-volatile buffer memory circuitry 16 of the solid-state storage device 100 based on the location of the file system metadata. For example, the controller method may be executed by the solid-state storage device, e.g. by the controller apparatus or controller device of the solid-state storage device.

The following description relates both to the controller apparatus 10 or controller device 10 of FIG. 1a and to the controller method of FIG. 1b.

At least some examples relate to a controller apparatus, controller device or a controller method for the solid-state storage device 100. In examples, the controller apparatus, controller device or a controller method may provide an interface between the host computer 1000 and the storage of the solid-state storage device. For example, the controller apparatus or device may be configured to provide access to the partition to the host computer, e.g. by executing storage transactions that are obtained from the host computer 1000. In other words, the host computer 1000 may provide one or more storage transactions to the controller apparatus or device, and the controller apparatus may execute the one or more storage transactions, e.g. by changing the content of the non-volatile buffer memory circuitry 16 and/or of the storage circuitry, or by reading out a content of the non-volatile buffer memory circuitry 16 and/or of the storage circuitry and providing the content to the host computer 1000. In other words, the controller apparatus or device 10 may be a storage controller of the solid-state storage device.

In at least some examples, the solid-state storage device may be a flash-based storage device. For example, the storage circuitry 18 may be flash-based storage circuitry 18. Alternatively, the storage circuitry 18 may be a persistent memory-based storage circuitry 18. In general, the storage circuitry 18 may be a computer-readable storage medium, e.g. a solid-state storage medium.

The solid-state storage device further comprises the non-volatile buffer memory circuitry 16. The non-volatile buffer memory circuitry 16 may comprise a non-volatile memory (also denoted non-volatile storage), e.g. a computer memory that can retrieve stored information even after having been power cycled. In other words, the non-volatile buffer memory circuitry 16 may be random access memory that is non-volatile, i.e. a random access memory that is configured to retain the stored information in case of the power cycle. In examples, the non-volatile buffer memory circuitry 16 may be a memory that supports a larger amount of write cycles than flash memory/storage. In other words, the non-volatile buffer memory circuitry 16 might not be based on flash memory/storage.

In some examples, the non-volatile buffer memory circuitry 16 may be based on persistent memory. The persistent memory may be based on Intel® 3D XPoint™. Intel and 3D XPoint are trademarks of Intel Corporation or its subsidiaries in the U.S. and/or other countries. Persistent memory may be used as a non-volatile buffer memory circuitry, as it is non-volatile while providing an access that is similar to volatile memory. For example, the persistent memory may be based on using a change of bulk resistance of the persistent memory to store information.

In various examples, the non-volatile buffer memory circuitry 16 may be based on phase-change memory. Phase-change memory is a type of non-volatile random-access memory. Phase-change memory is usually based on Chalcogenide glass, which is switched between an amorphous and a crystalline state using a heating element to store information.

Alternatively or additionally, the non-volatile buffer memory circuitry 16 may comprise dynamic or static random access memory and circuitry for storing data stored within the dynamic or static random access memory in case of a power cycle. For example, the circuitry for storing data stored within the dynamic or static random access memory in case of a power cycle may be based on flash memory/storage, or based on phase-change memory. For example, in case a loss of power, such as a power cycle, of the non-volatile buffer memory circuitry 16 is detected, the non-volatile buffer memory circuitry 16 may be configured to write out the content of the dynamic or static random access memory to the flash memory, e.g. using energy stored within capacitors of the solid-state storage device 100. This may enable the use of a combination of random access memory and flash storage to provide the non-volatile buffer memory circuitry.

The processing circuitry is configured to obtain the control instruction related to the file system of the partition from the host computer. For example, the control instruction may be based on a storage device instruction protocol, e.g. based on the Non-Volatile Memory Express (NVMe) control instruction protocol. For example, the NVMe Format command may be used for the control instruction. This may enable using the functionality in an extension of the NVMe instruction protocol. For example, the control instruction may originate from the host computer 1000, e.g. from a user application running on the host computer 1000, or from an operating system of the host computer 1000.

The file system may be any file system that uses one or more dedicated locations for storing the file system metadata. For example, the file system may be a block-based file system. In at least some examples, the file system a file system of the "extended file systems (ext)" used primarily in the Linux operating system, e.g. an ext2, ext3 or ext4 file system. Alternatively, the file system may be another file system, e.g. one of ZFS (Z File System), BTRFS (b-tree File System), New Technology File System (NTFS), Extended File Allocation Table (exFAT), Apple File System (APFS) and Hierarchical File System (HFS).

The partition may be a storage region that is at least partially stored within the storage circuitry 18 of the solid-state storage device. In some examples, the partition may be entirely located within the storage circuitry 18 of the solid-state storage device, except for the file-system metadata. Alternatively, the partition may span multiple solid-state storage devices, i.e. if the solid-state storage device is used in a redundant array of independent disks (RAID), e.g. a software RAID or a hardware RAID.

The control instruction indicates a location of file system metadata within the partition. For example, the control instruction may indicate or comprise one of a location identifier for the file system metadata, one or more logical addresses of the file system metadata, and a location identifier of one or more logical blocks comprising the file system metadata. In general, the file system metadata is data that is changed in addition to payload or content data when a content of the partition is changed. For example, if a file is changed within the partition, the metadata of the file system may be changed to reflect an increased file size of the file. If a file is moved, the content of the file may remain unchanged, but the metadata of the file system may be changed to reflect the updated location of the file. For example, the file system metadata may comprise at least one of a group descriptor of the file system, a data block bitmap of the file system, an inode bitmap of the file system, and an inode table of the file system (e.g. in case of ext, ext3 or ext4). For example, the group descriptor may be a data structure for describing a block of groups, the data block bitmap may be a sequence of bits, with each bit representing a specific block, the inode bitmap may be a sequence of bits, with each bit representing an inode, and the inode table may comprise information the operating system may need to know about a file, e.g. a file type, permissions, owner, and the location of data blocks of the file. An inode (i.e. index node) is a data structure on a filesystem on Linux and other Unix-like operating systems that stores all the information about a file except its name and its actual data.

The processing circuitry is configure to store the file system metadata within the non-volatile buffer memory circuitry 16 of the solid-state storage device 100 based on the location of the file system metadata. This may usually be done by internally mapping the file system metadata to the non-volatile buffer memory circuitry 16, e.g. by copying the content of the file system metadata to the non-volatile buffer memory circuitry 16 and changing an internal mapping of the location of the file system metadata to the respective location within the non-volatile buffer memory circuitry 16. For example, the control apparatus may comprise an internal data structure for mapping (i.e. mapping data structure) a first address range that is used to access the solid-state storage device from the host computer (e.g. a logical address range) to a second address range that is used to access the non-volatile buffer memory circuitry 16 or the storage circuitry 18 within the solid-state storage device 100 (e.g. a physical address range). For example, the mapping data structure may be denoted Logical-to-Physical (L2P) data structure.

For example, the processing circuitry 14 may be configured to map the location (i.e. a location within the solid-state storage device) of the file system metadata to the non-volatile buffer memory circuitry 16. The mapping may be invisible to the host computer, i.e. the processing circuitry 14 may map the location of the file system metadata to the non-volatile buffer memory circuitry 16 without changing the location of the file system metadata within the partition. For example, the processing circuitry 14 is configured to map one or more logical addresses of the file system metadata to one or more physical addresses of the non-volatile buffer memory circuitry 16. In at least some examples, the partition is logically divided into a plurality of logical blocks. The processing circuitry 14 may be configured to map one or more logical blocks comprising the file system metadata to the non-volatile buffer memory circuitry 16.

For example, the processing circuitry may comprise a data structure with a mapping between logical addresses and physical addresses (i.e. the mapping data structure/L2P data structure), and the processing circuitry may be configured to change the data structure such, that the one or more logical addresses of the file system metadata to one or more physical addresses of the non-volatile buffer memory circuitry 16. In various examples, the processing circuitry 14 is configured to provide access to the partition to the host computer based on a logical address range of the partition. The processing circuitry 14 may be configured to map a part of the logical address range that represents the location of the file system metadata to one or more physical addresses of the non-volatile buffer memory circuitry 16. In other words, the file system metadata may be stored within the non-volatile buffer memory circuitry 16 without changing a logical address of the location of the metadata within the file system. By mapping the addresses or blocks comprising the file system metadata to the non-volatile buffer memory circuitry, the file system metadata may be stored within the non-volatile buffer memory circuitry without changing the file system itself.

In at least some examples, more than one partition may be at least partially stored within the storage circuitry, e.g. a plurality of partitions. In these cases, the file system metadata of the plurality of partitions may be stored within the non-volatile buffer memory circuitry 16. For example, the processing circuitry 14 may be configured to obtain one or more control instructions related to file systems of a plurality of partitions from the host computer. The plurality of partitions may be at least partially stored within the storage circuitry 18 of the solid-state storage device 100. The one or more control instructions indicating a location of file system metadata within the plurality of partitions. The processing circuitry 14 may be configured to store the file system metadata within the non-volatile buffer memory circuitry 16 of the solid-state storage device 100 based on the location of the file system metadata. This may enable a support of multiple partitions, which may share the non-volatile buffer memory circuitry for storing the respective metadata of the file systems of the partitions.

In some examples, the solid-state storage device may support the concept of namespaces. When using namespaces, the solid-state storage device may be divided into a plurality of namespaces, which may each comprise a storage region that is formatted for block access. For example, namespaces may be used if the host computer 1000 is a virtual machine host that is configured to execute a plurality of virtual machines. Each virtual machine of the plurality of virtual machines may be assigned a namespace of the solid-state storage device. The processing circuitry may be configured to distinguish storage transactions based on the namespaces. In some cases, the plurality of partitions may be associated with the same namespace (e.g. NVMe namespace) of the solid-state storage device. Alternatively, the plurality of partitions may be associated with a plurality of namespaces of the solid-state storage device 100.

The interface circuitry or means for communicating 12 may correspond to one or more inputs and/or outputs for receiving and/or transmitting information, which may be in digital (bit) values according to a specified code, within a module, between modules or between modules of different entities. For example, the means for communicating 12 may comprise interface circuitry configured to receive and/or transmit information. In at least some examples, the interface circuitry is configured to communicate with the non-volatile buffer memory circuitry 16 and/or with the storage circuitry 18. Alternatively, the non-volatile buffer memory circuitry 16 and/or with the storage circuitry 18 may be (directly) connected to the processing circuitry 14.

In examples, the host computer 1000 may be any kind of computer-based system, e.g. one of a personal computer, a laptop computer, a server, a workstation, or a mobile device, such as a tablet computer, a convertible computer, a smartphone or a wearable. In some examples, the host computer 1000 may be a professional or consumer electronic device, such as a surveillance station or a digital camera.

In examples, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing 14 may as well be implemented in software, which is then executed on one or more programmable hardware components. Such hardware components may comprise a general-purpose processor, a Digital Signal Processor (DSP), a micro-controller, etc.

More details and aspects of the controller apparatus, controller device or controller method are mentioned in connection with the proposed concept or one or more examples described above or below (e.g. FIG. 2a to 3). The controller apparatus, controller device or controller method may comprise one or more additional optional features corresponding to one or more aspects of the proposed concept or one or more examples described above or below.

Figure 2A:
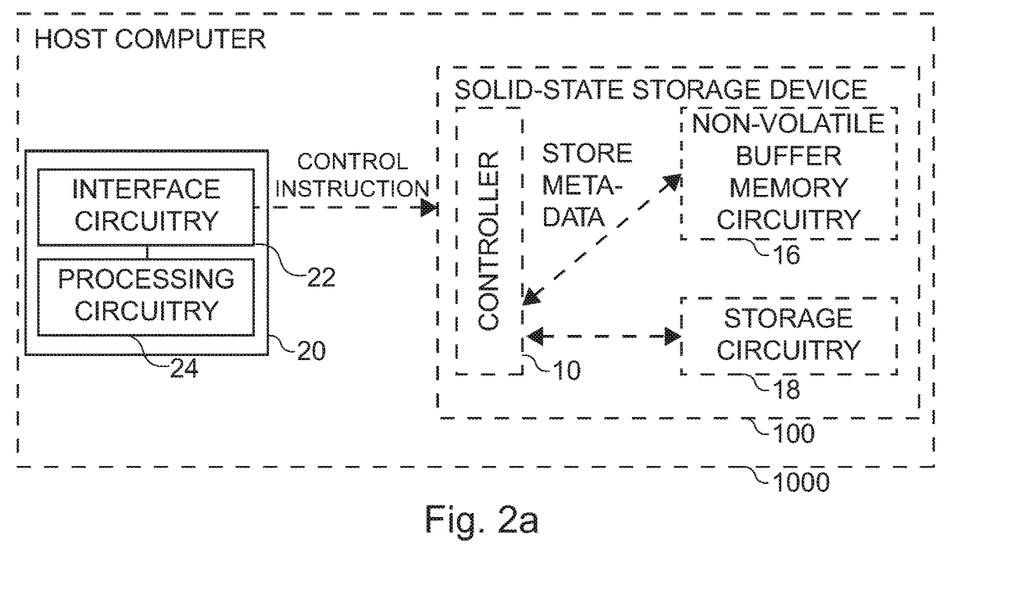
FIG. 2a shows a block diagram of an example of an apparatus or device for a host computer, and of a host computer comprising a solid-state storage device and an apparatus or device suitable for a host computer.

FIG. 2a shows a block diagram of an example of an apparatus 20 or device 20 for a host computer 1000. The components of the device 20 are defined as component means, which correspond to the respective structural components of the apparatus 20. The apparatus 20 comprises interface circuitry 22 (i.e. means for communicating 22) for communicating with a solid-state storage device 100. The solid-state storage device 100 comprises non-volatile buffer memory circuitry 16 and storage circuitry 18. The apparatus 20 further comprises processing circuitry 24 (i.e. means for processing 24) that is coupled to the interface circuitry. The processing circuitry 24 is configured to determine a location of file system metadata of a file system of a partition. The partition is at least partially stored within the storage circuitry 18 of the solid-state storage device 100. The processing circuitry 24 is configured to provide a control instruction related to the file system of the partition to the solid-state storage device 100. The control instruction indicates the location of the file sys-tem metadata within the partition. FIG. 2a further shows the host computer 1000 comprising the solid-state storage device and the apparatus or device 20.

Figure 2B:
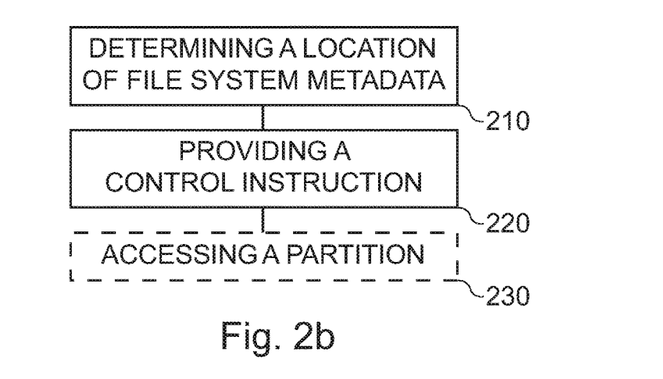
FIG. 2b shows a flow chart of an example of a method for a host computer.

FIG. 2b shows a flow chart of an example of a (corresponding) method for a host computer. The method comprises determining 210 the location of the file system metadata of the file system of the partition. The method comprises providing 220 the control instruction related to the file system of the partition stored within the storage circuitry 18 of the solid-state storage device 100 to the solid-state storage device 100, the control instruction indicating the location of the file system metadata within the partition. For example, the method may be executed by the host computer, e.g. by the apparatus 20 or device 20 for the host computer 1000.

The following description relates both to the apparatus or device of FIG. 2a and to the method of FIG. 2b.

Some examples relate to an apparatus, device and method for the host computer 1000. In examples, to enable the controller of the solid-state storage device to store the file system metadata within the non-volatile buffer memory circuitry 16, the controller may require the location of the metadata, e.g. in order to identify which blocks and/or logical addresses are to be mapped to the non-volatile buffer memory circuitry 16. Accordingly, the apparatus, device and method for the host computer 1000 may be used to determine the location of the file system metadata, generate a control instruction that comprises information related to the location of the file system metadata, and provide the control instruction to the solid-state storage device, e.g. to a controller apparatus or controller device 10 of the solid-state storage device. In at least some examples, the apparatus, device and method may be implemented by an operating system of the host computer 1000. Alternatively, the apparatus, device and method may be implemented by a user program that is executable on the host computer 1000.

The processing circuitry 24 is configured to determine the location of the file system metadata of the file system of the partition. For example, a service or daemon may be executed by the operating system that automatically detects the location of the metadata and passes location of the metadata to the solid-state storage device. The processing circuitry may be configured to retrieve the location of the file system metadata from a partition information data structure of the partition, such as a partition table. In some examples, the partition may be split up into blocks, which may be grouped into block groups. Each block group may comprise blocks that comprise a chunk of the file system metadata, e.g. each group of blocks may comprise a block bitmap, an inode bitmap, an inode table. For example, the location of the file system metadata may be scattered across the partition, i.e. located within at least 2 (or at least 4, at least 8, at least 16) non-consecutive blocks within the partition. For example, the processing circuitry 24 may be configured to determine the location of the file system metadata based on the location of the block groups, e.g. by calculating the location of the file system metadata relative to the location of the block groups. In some examples, external file system tools may be used, such as e2fsprogs of mkfs.

The processing circuitry 24 may be further configured to generate the control instruction, e.g. by compiling the location of the file system metadata. For example, the control instruction may be suitable for instructing a controller apparatus 10 of the solid-state storage device 100 to store the file system metadata of the partition within the non-volatile buffer memory circuitry 16 of the solid-state storage device 100, e.g. as shown in connection with FIGS. 1a and/or 1b.

The processing circuitry is configured to provide (e.g. to transmit) the control instruction to the solid-state storage device 100. The control instruction indicates the location of the file system metadata within the partition. For example, the control instruction may indicate or comprise one of a location identifier for the file system metadata, one or more logical addresses of the file system metadata, and a location identifier of one or more logical blocks comprising the file system metadata.

In some examples, the processing circuitry 24 may be configured to access the partition to the host computer based on a logical address range of the partition. For example, the processing circuitry 24 may be configured to provide one or more storage transactions to the controller 10 of the solid-state storage device. The one or more storage transactions may comprise one or more logical addresses of data to be accessed, i.e. read out or written to, within the partition. For example, the one or more storage transactions may be executed by the solid-state storage device 100. In case of a read transaction, the processing circuitry may be configured to receive a result of the read transaction in response to the read transaction. For example, one or more logical addresses of the file system metadata (e.g. all of the logical addresses of the file system metadata) within the logical address range of the partition may be unaffected by the storing of the file system metadata of the partition within the non-volatile buffer memory circuitry 16 of the solid-state storage device 100.

In at least some examples, more than one partition may be at least partially stored within the storage circuitry, e.g. a plurality of partitions. In these cases, the file system metadata of the plurality of partitions may be stored within the non-volatile buffer memory circuitry 16. Accordingly, the processing circuitry 24 may be configured to determine a location of file system metadata of file system of the plurality of partitions. The processing circuitry 24 may be configured to provide one or more control instructions related to the file systems of the plurality of partitions to the solid-state storage device 100. The plurality of partitions may be at least partially stored within the storage circuitry 18 of the solid-state storage device 100. The one or more control instructions may indicate a location of file system metadata within the plurality of partitions.

The interface circuitry or means for communicating 22 may correspond to one or more inputs and/or outputs for receiving and/or transmitting information, which may be in digital (bit) values according to a specified code, within a module, between modules or between modules of different entities. For example, the means for communicating 22 may comprise interface circuitry configured to receive and/or transmit information.

In examples, the host computer 1000 may be any kind of computer-based system, e.g. one of a personal computer, a laptop computer, a server, a workstation, or a mobile device, such as a tablet computer, a convertible computer, a smartphone or a wearable. In some examples, the host computer 1000 may be a professional or consumer electronic device, such as a surveillance station or a digital camera.

In examples, the processing circuitry 24 or means for processing 24 may be implemented using one or more processing units, one or more processing devices, any means for processing, such as a processor, a computer or a programmable hardware component being operable with accordingly adapted software. In other words, the described function of the processing circuitry 24 or means for processing 24 may as well be implemented in software, which is then executed on one or more programmable hardware components. Such hardware components may comprise a general-purpose processor, a Digital Signal Processor (DSP), a micro-controller, etc.

More details and aspects of the apparatus, device or method are mentioned in connection with the proposed concept or one or more examples described above or below (e.g. FIG. 1a to 2b, 3). The apparatus, device or method may comprise one or more additional optional features corresponding to one or more aspects of the proposed concept or one or more examples described above or below.

Examples provide a method for mapping file system metadata LBAs (Logical Block Addressing/Addresses) into persistent memory of a hybrid SSD. In an exemplary embodiment, examples provide a method for configuring an Integrated Memory Buffer (IMB) into multiple LBA ranges.

Linux File Systems (FS), such as ext2/3/4, can have a large SSD write amplification for small file operations. The same is true for other file systems. Examples may reduce the SSD write amplification by moving the FS metadata into a non-volatile buffer of the SSD (e.g. the solid-state storage device), e.g. within a non-volatile DRAM region of the SSD without touching the FS itself.

Figure 3:
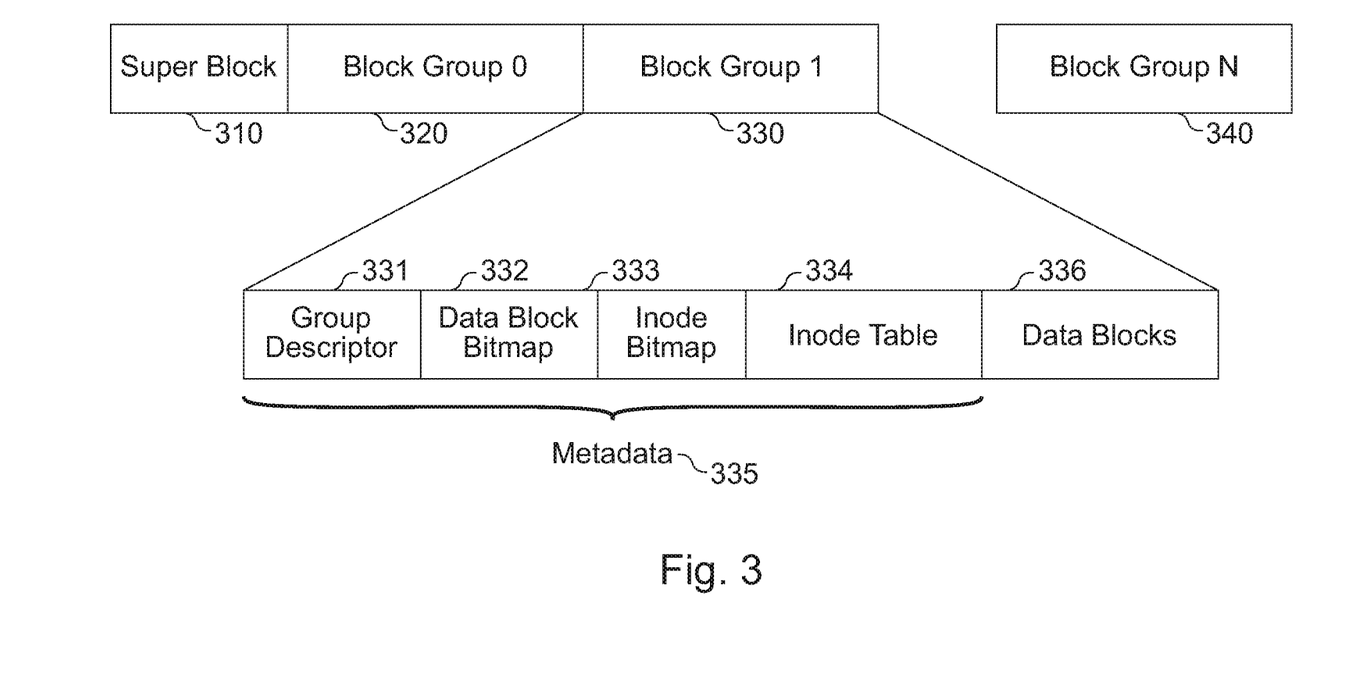
FIG. 3 shows a schematic diagram of a file system layout according to an example.

As shown in FIG. 3, Linux FS (File Systems), such as ext2/3/4, divide the (entire) storage device into multiple data block groups. FIG. 3 shows a schematic diagram of an ext2-based file system layout according to an example. FIG. 3 shows a partition comprising a super block 310 and block groups 0 to N (reference signs 320 to 340). Each block group, e.g. block group 1 330, may comprise a group descriptor 331, a data block bitmap 332, an inode bitmap 333, an inode table 334 and data blocks 336. The file system metadata 335 of the partition may comprise a group descriptor 331, a data block bitmap 332, an inode bitmap 333, and an inode table 334 for each block group. Each group may contain up to 32768 blocks. The first few blocks of each group are reserved for FS metadata 335, which may include the group descriptor, data block bitmap, inode bitmap, and inode table. As can be seen, the metadata LBAs may be scattered across the entire LBA spaces, and they might not be consecutive with data LBAs. In other words, most of the blocks may be used for file data storage, but a small portion of them may be reserved for metadata (e.g. the file system metadata), which may include group descriptor, data block bitmap, inode bitmap, and inode table. The group descriptor, data block bitmap, and inode bitmap may take one block per group. The inode table may take several blocks per group, which may depend on inode size and inode numbers per group.

For file operations, such as create/write/modify, the metadata (data block bitmap, inode bitmap, and inode table) may be updated first before the actual data can be written to the data blocks. In other words, for file operations, such as create/write/modify, the metadata (data block bitmap, inode bitmap, and inode table) may be changed before the file data is written to the data blocks. The metadata LBAs (e.g. the location of the file system metadata) might be written more frequently than the actual data LBAs especially if the file size is small. If the file size is small, then there may be more metadata writes than the data writes. For example, writing a 4K data block of a file can lead to 16K writes to the SSD. The first 4K may be used for writing the data block bitmap. The 2nd 4K may be used for writing the inode bitmap. The 3rd 4K may be used for writing the inode table, and the last 4K may be used for writing the for the actual file data. Because the metadata LBAs are scattered across the entire LBA spaces and they are not consecutive with data LBAs, FS metadata writes may increase the device level write amplification due to small random writes. The metadata writes may be random writes because the LBA of the metadata blocks and data blocks are not consecutive, these operations may consume additional NAND writes and increase the device level write amplification.

Hybrid SSDs may comprise a PM (Persistent Memory), such as 3DXP media or DRAM with PLI backup, in addition to NAND media (i.e. flash based memory/storage that is based on Not-And gates). For example, the PM may correspond to the non-volatile buffer memory circuitry 16 of the solid-state storage device 100. Compared to NAND, the PM is a write-in-place media, and may be more endurable than NAND. An Integrated Memory Buffer (IMB) is an implementation of the PM. IMB is a technology which uses a part of the unused SSD DRAM as a non-volatile memory region by using SSD internal energy (such as capacitors) or external energy to flush DRAM data to NAND media during power cycle. It may have an extremely low latency (~10 us for 4KiB read and writes), virtually infinite endurance (it only consumes NAND endurance during power cycle), and higher performance (~650K IOPs for 4KiB unaligned random writes).

Examples provide a method for mapping file system metadata LBAs (e.g. the location of the file system metadata) into the PM of a hybrid SSD (e.g. the solid-state storage device) without changing the existing FS. The proposed method may reduce a write amplification of typical workloads by 2~10×, and may be easy to use for real-world applications. The FS metadata LBAs may e.g. be identified by using the open source tool e2fsprogs. Once the LBAs (e.g. the location of the file system metadata) are identified, the concepts introduced above or below may be used to map these LBAs into PM.

Compared to systems comprising a hybrid SSD (NAND+ 3DXP) and a hybrid FS, which moves the FS metadata to 3DXP, examples may provide a reduced implementation complexity. Although such systems may reduce an SSD write amplification, the hybrid FS may use several new data structures and new file operations. This may introduce additional complexity to the FS design, increased the SSD Build-of-Material (BOM) cost and compatibilities issues for existing systems. Compared to such designs, examples might not increase SSD BOM cost because the SSDs generally have unused DRAM (from tens to hundreds of MB), and DRAM controllers might already be comprises in the SSD controller.

In some cases, the IMB might also be used as a separate namespace or as a high performance write buffer. The namespace approach may be used to reduce the SSD write amplification for applications such as the FS. However, it may require changes to the host software, such as a fine-granular access to a storage device.

Examples might not change any existing FS or their utilities and may be fully compatible with existing systems.

In some examples, if the hybrid SSD is configured into multiple namespaces, each namespace may own a portion of PM/IMB via the proposed method. This may be beneficial in a virtual machine environment, where multiple users share a single SSD, but each one owns a namespace and can install a different FS.

Examples thus introduce and/or provide a mechanism to let the host map different LBA ranges to PM of a hybrid SSD. Examples may further provide or introduce a new L2P (Logical to Physical address) mapping method in FTL (Flash Translation Layer) so that certain LBAs can be mapped into PM of a hybrid SSD. In other words, examples may configure IMB into multiple LBA ranges. Examples may further identify FS metadata LBAs, and relocate them to IMB without changing FS or its utility. Examples may thus provide an internal translation scheme, which may specify how the blocks that are to go to the IMB are detected and sent there instead of the NAND. Inside the SSD, the L2P table may be used track the IMB memory offset for the corresponding LBAs with a token to indicate the corresponding address is an IMB memory offset instead of a NAND address.

At least some examples may provide an SSD level write amplification reduction by 2~10× for typical workloads, e.g. without additional BOM cost. Furthermore, examples may improve a performance (e.g. of Linux ext2/3/4) by at least 2× for typical workloads.

Examples may map multiple LBA ranges into PM. In other words, an IMB of an ASSD may be configured into multiple LBA ranges.

The configuration/mapping might be performed using a standard NVMe format command or a vendor unique command providing the following parameters:

IMB ID (for NVMe Format Command) or Opcode (for vendor unique command)
Number of LBA Ranges
Start LBA of the $1^{st}$ LBA Ranges, Length of the $1^{st}$ LBA Range
Start LBA of the $2^{nd}$ LBA Ranges, Length of the $2^{nd}$ LBA Range
. . .
Start LBA of the Last LBA Ranges, Length of the Last LBA Range Once the SSD firmware (e.g. the controller apparatus or device 10) receives this command, it may update the L2P indirection table (e.g. the data structure) to map the corresponding LBA to the PM (i.e. IMB memory region). For example, an entry to the L2P that maps an LBA to a PM region (i.e. IMB memory region) may comprise the following information

[PM/IMB Token (such as 0xFF), PM/IMB Memory Sector Offset]

The rest of the L2P table might still map LBAs to NAND address. The firmware may access different media based on the host LBAs by using this approach.

If this command fails due to insufficient PM capacity, it may return the available capacity to the host, so that host can re-map the LBAs based on the available capacity.

Examples may further identify the LBA of the file system metadata. For example, this may be accomplished by adding some debug information (such as "printf") in Linux FS utilities (such as "mkfs"), which are open source. Alternatively, this may be accomplished using the open source tool e2fsprogs. The utilities may report the LBA of superblock, block bitmaps, inode bitmap, and inode table of each group. For example, a service may be added, e.g. to the operating system, that automatically detects the LBAs used by metadata. No matter if the host application detects the metadata LBAs manually or automatically, they will the same method, apparatus or devices may be used to map LBA ranges to IMB. Those LBAs may be mapped to the IMB by the controller method, controller apparatus or controller device introduced above. For example, an NVMe format command or vendor unique command may be used to map LBA ranges to IMB based on the detected LBAs.

Examples may be easily used for real life scenarios/applications. For example, the Linux File System controls which LBAs are used for FS metadata, and they are configurable via FS utilities such as mkfs. For users who are not familiar with the FS, they can simply enable the debug message of mkfs to print out which LBAs stores metadata such as the bitmap, inode, etc.

Examples may further support multiple namespaces. For example, the approach may be extended to support multiple namespaces in a single storage device, where each namespace can have their own FS.

Examples provide an SSD having a PM/IMB region (or similar technology), with the region being configurable into LBA ranges.

The aspects and features mentioned and described together with one or more of the previously detailed examples and figures, may as well be combined with one or more of the other examples in order to replace a like feature of the other example or in order to additionally introduce the feature to the other example.

Example 1 relates to a controller apparatus 10 for a solid-state storage device 100, the solid-state storage device 100 comprising non-volatile buffer memory circuitry 16 and storage circuitry 18, the controller apparatus comprising interface circuitry 12 for communicating with a host computer 1000. The controller apparatus 10 comprises processing circuitry 14 configured to obtain a control instruction related to a file system of a partition from the host computer, the partition being at least partially stored within the storage circuitry 18 of the solid-state storage device 100, the control instruction indicating a location of file system metadata within the partition, and store the file system metadata within the non-volatile buffer memory circuitry 16 of the solid-state storage device 100 based on the location of the file system metadata.

In Example 2, the subject matter of example 1 or any of the Examples described herein may further include, that the processing circuitry 14 is configured to map the location of the file system metadata to the non-volatile buffer memory circuitry 16.

In Example 3, the subject matter of example 2 or any of the Examples described herein may further include, that the processing circuitry 14 is configured to map one or more logical addresses of the file system metadata to one or more physical addresses of the non-volatile buffer memory circuitry 16.

In Example 4, the subject matter of one of the examples 2 to 3 or any of the Examples described herein may further include, that the partition is logically divided into a plurality of logical blocks, wherein the processing circuitry 14 is configured to map one or more logical blocks comprising the file system metadata to the non-volatile buffer memory circuitry 16. In Example 5, the subject matter of one of the examples 1 to 4 or any of the Examples described herein may further include, that the processing circuitry 14 is configured to provide access to the partition to the host computer based on a logical address range of the partition, wherein the processing circuitry 14 is configured to map a part of the logical address range that represents the location of the file system metadata to one or more physical addresses of the non-volatile buffer memory circuitry 16.

In Example 6, the subject matter of one of the examples 1 to 5 or any of the Examples described herein may further include, that the file system metadata comprises at least one of a group descriptor of the file system, a data block bitmap of the file system, an inode bitmap of the file system, and an inode table of the file system.

In Example 7, the subject matter of one of the examples 1 to 6 or any of the Examples described herein may further include, that the file system metadata is stored within the non-volatile buffer memory circuitry 16 without changing a logical address of the location of the metadata within the file system.

In Example 8, the subject matter of one of the examples 1 to 7 or any of the Examples described herein may further include, that the non-volatile buffer memory circuitry 16 is based on persistent memory.

In Example 9, the subject matter of one of the examples 1 to 8 or any of the Examples described herein may further include, that the non-volatile buffer memory circuitry 16 is based on phase-change memory.

In Example 10, the subject matter of one of the examples 1 to 8 or any of the Examples described herein may further include, that the non-volatile buffer memory circuitry 16 comprises dynamic or static random access memory and circuitry for storing data stored within the dynamic or static random access memory in case of a power cycle.

In Example 11, the subject matter of one of the examples 1 to 10 or any of the Examples described herein may further include, that the control instruction is based on a Non-Volatile Memory Express control instruction protocol.

In Example 12, the subject matter of one of the examples 1 to 11 or any of the Examples described herein may further include, that the processing circuitry 14 is configured to obtain one or more control instructions related to file systems of a plurality of partitions from the host computer, the plurality of partitions being at least partially stored within the storage circuitry 18 of the solid-state storage device 100, the one or more control instructions indicating a location of file system metadata within the plurality of partitions, the processing circuitry 14 being configured to store the file system metadata within the non-volatile buffer memory circuitry 16 of the solid-state storage device 100 based on the location of the file system metadata.

In Example 13, the subject matter of example 12 or any of the Examples described herein may further include, that the plurality of partitions are associated with a plurality of namespaces of the solid-state storage device 100.

Example 14 relates to an apparatus 20 for a host computer, the apparatus comprising interface circuitry 22 for communicating with a solid-state storage device 100, the solid-state storage device 100 comprising non-volatile buffer memory circuitry 16 and storage circuitry 18. The apparatus 20 comprises processing circuitry 24 configured to determine a location of file system metadata of a file system of a partition, the partition at least partially being stored within the storage circuitry 18 of the solid-state storage device 100, and provide a control instruction related to the file system of the partition to the solid-state storage device 100, the control instruction indicating the location of the file system metadata within the partition.

In Example 15, the subject matter of example 14 or any of the Examples described herein may further include, that the control instruction is suitable for instructing a controller apparatus 10 of the solid-state storage device 100 to store the file system metadata of the partition within the non-volatile buffer memory circuitry 16 of the solid-state storage device 100.

In Example 16, the subject matter of example 15 or any of the Examples described herein may further include, that the processing circuitry 24 is configured to access the partition based on a logical address range of the partition, wherein one or more logical addresses of the file system metadata within the logical address range of the partition are unaffected by the storing of the file system metadata of the partition within the non-volatile buffer memory circuitry 16 of the solid-state storage device 100.

In Example 17, the subject matter of one of the examples 14 to 16 or any of the Examples described herein may further include, that the processing circuitry 24 is configured to determine a location of file system metadata of file system of a plurality of partitions, and to provide one or more control instructions related to the file systems of the plurality of partitions to the solid-state storage device 100, the plurality of partitions being at least partially stored within the storage circuitry 18 of the solid-state storage device 100, the one or more control instructions indicating a location of file system metadata within the plurality of partitions.

Example 18 relates to a solid-state storage device 100 comprising the controller apparatus 10 according to one of the examples 1 to 13, non-volatile buffer memory circuitry 16 and storage circuitry 18.

Example 19 relates to a host computer 1000 comprising the solid-state storage device 100 according to example 19.

In Example 20, the subject matter of one of the examples 14 to 17 or any of the Examples described herein may further include the apparatus 20 according to one of the examples 14 to 17.

Example 21 relates to a controller device 10 for a solid-state storage device 100, the solid-state storage device 100 comprising non-volatile buffer memory means 16 and storage means 18. The controller device comprises communication means 12 for communicating with a host computer 1000. The controller device 10 comprises means for processing 14 configured for obtaining a control instruction related to a file system of a partition from the host computer, the partition being at least partially stored within the storage means 18 of the solid-state storage device 100, the control instruction indicating a location of file system metadata within the partition, and storing the file system metadata within the non-volatile buffer memory means 16 of the solid-state storage device 100 based on the location of the file system metadata.

In Example 22, the subject matter of example 21 or any of the Examples described herein may further include, that the means for processing 14 is configured for mapping the location of the file system metadata to the non-volatile buffer memory means 16.

In Example 23, the subject matter of example 22 or any of the Examples described herein may further include, that the means for processing 14 is configured for mapping one or more logical addresses of the file system metadata to one or more physical addresses of the non-volatile buffer memory means 16.

In Example 24, the subject matter of one of the examples 22 to 23 or any of the Examples described herein may further include, that the partition is logically divided into a plurality of logical blocks, wherein the means for processing 14 is configured for mapping one or more logical blocks comprising the file system metadata to the non-volatile buffer memory means 16.

In Example 25, the subject matter of one of the examples 21 to 24 or any of the Examples described herein may further include, that the means for processing 14 is configured for providing access to the partition to the host computer based on a logical address range of the partition, wherein the means for processing 14 is configured for mapping a part of the logical address range that represents the location of the file system metadata to one or more physical addresses of the non-volatile buffer memory means 16.

In Example 26, the subject matter of one of the examples 21 to 25 or any of the Examples described herein may further include, that the file system metadata comprises at least one of a group descriptor of the file system, a data block bitmap of the file system, an inode bitmap of the file system, and an inode table of the file system.

In Example 27, the subject matter of one of the examples 21 to 26 or any of the Examples described herein may further include, that the file system metadata is stored within the non-volatile buffer memory means 16 without changing a logical address of the location of the metadata within the file system.

In Example 28, the subject matter of one of the examples 21 to 27 or any of the Examples described herein may further include, that the non-volatile buffer memory means 16 is based on persistent memory.

In Example 29, the subject matter of one of the examples 21 to 28 or any of the Examples described herein may further include, that the non-volatile buffer memory means 16 is based on phase-change memory.

In Example 30, the subject matter of one of the examples 21 to 28 or any of the Examples described herein may further include, that the non-volatile buffer memory means 16 comprises dynamic or static random access memory and circuitry for storing data stored within the dynamic or static random access memory in case of a power cycle.

In Example 31, the subject matter of one of the examples 21 to 30 or any of the Examples described herein may further include, that the control instruction is based on a Non-Volatile Memory Express control instruction protocol.

In Example 32, the subject matter of one of the examples 21 to 31 or any of the Examples described herein may further include, that the means for processing 14 is configured for obtaining one or more control instructions related to file systems of a plurality of partitions from the host computer, the plurality of partitions being at least partially stored within the storage means 18 of the solid-state storage device 100, the one or more control instructions indicating a location of file system metadata within the plurality of partitions, the means for processing 14 being configured for storing the file system metadata within the non-volatile buffer memory means 16 of the solid-state storage device 100 based on the location of the file system metadata.

In Example 33, the subject matter of example 32 or any of the Examples described herein may further include, that the plurality of partitions are associated with a plurality of namespaces of the solid-state storage device 100.

Example 34 relates to a device 20 for a host computer, the device comprising communication means 22 for communicating with a solid-state storage device 100, the solid-state storage device 100 comprising non-volatile buffer memory means 16 and storage means 18. The device 20 comprises means for processing 24 configured for determining a location of file system metadata of a file system of a partition, the partition at least partially being stored within the storage means 18 of the solid-state storage device 100, and providing a control instruction related to the file system of the partition to the solid-state storage device 100, the control instruction indicating the location of the file system metadata within the partition.

In Example 35, the subject matter of example 34 or any of the Examples described herein may further include, that the control instruction is suitable for instructing a controller device 10 of the solid-state storage device 100 to store the file system metadata of the partition within the non-volatile buffer memory means 16 of the solid-state storage device 100.

In Example 36, the subject matter of example 35 or any of the Examples described herein may further include, that the means for processing 24 is configured for accessing the partition based on a logical address range of the partition, wherein one or more logical addresses of the file system metadata within the logical address range of the partition are unaffected by the storing of the file system metadata of the partition within the non-volatile buffer memory means 16 of the solid-state storage device 100.

In Example 37, the subject matter of one of the examples 34 to 36 or any of the Examples described herein may further include, that the means for processing 24 is configured for determining a location of file system metadata of file system of a plurality of partitions, and for providing one or more control instructions related to the file systems of the plurality of partitions to the solid-state storage device 100, the plurality of partitions being at least partially stored within the storage means 18 of the solid-state storage device 100, the one or more control instructions indicating a location of file system metadata within the plurality of partitions.

Example 38 relates to a solid-state storage device 100 comprising the controller device 10 according to one of the examples 21 to 33, non-volatile buffer memory means 16 and storage means 18.

Example 39 relates to a host computer 1000 comprising the solid-state storage device 100 according to example 39.

In Example 40, the subject matter of one of the examples 34 to 37 or any of the Examples described herein may further include the device 20 according to one of the examples 34 to 37.

Example 41 relates to a controller method for a solid-state storage device 100, the solid-state storage device 100 comprising non-volatile buffer memory circuitry 16 and storage circuitry 18. The controller method comprises obtaining 110 a control instruction related to a file system of a partition from a host computer 1000, the partition being at least partially stored within the storage circuitry 18 of the solid-state storage device 100, the control instruction indicating a location of file system metadata within the partition. The controller method comprises storing 120 the file system metadata within the non-volatile buffer memory circuitry 16 of the solid-state storage device 100 based on the location of the file system metadata.

In Example 42, the subject matter of example 41 or any of the Examples described herein may further include, that the controller method comprises mapping 122 the location of the file system metadata to the non-volatile buffer memory circuitry 16.

In Example 43, the subject matter of example 42 or any of the Examples described herein may further include, that the controller method comprises mapping 124 one or more logical addresses of the file system metadata to one or more physical addresses of the non-volatile buffer memory circuitry 16.

In Example 44, the subject matter of one of the examples 42 to 43 or any of the Examples described herein may further include, that the partition is logically divided into a plurality of logical blocks, the controller method comprising mapping 126 one or more logical blocks comprising the file system metadata to the non-volatile buffer memory circuitry 16.

In Example 45, the subject matter of one of the examples 41 to 44 or any of the Examples described herein may further include, that the controller method comprises providing 130 access to the partition to the host computer based on a logical address range of the partition, the controller method comprising mapping 128 a part of the logical address range that represents the location of the file system metadata to one or more physical addresses of the non-volatile buffer memory circuitry 16.

In Example 46, the subject matter of one of the examples 41 to 45 or any of the Examples described herein may further include, that the file system metadata comprises at least one of a group descriptor of the file system, a data block bitmap of the file system, an inode bitmap of the file system, and an inode table of the file system.

In Example 47, the subject matter of one of the examples 41 to 46 or any of the Examples described herein may further include, that the file system metadata is stored within the non-volatile buffer memory circuitry 16 without changing a logical address of the location of the metadata within the file system.

In Example 48, the subject matter of one of the examples 41 to 47 or any of the Examples described herein may further include, that the non-volatile buffer memory circuitry 16 is based on persistent memory.

In Example 49, the subject matter of one of the examples 41 to 48 or any of the Examples described herein may further include, that the non-volatile buffer memory circuitry 16 is based on phase-change memory.

In Example 50, the subject matter of one of the examples 41 to 48 or any of the Examples described herein may further include, that the non-volatile buffer memory circuitry 16 comprises dynamic or static random access memory and circuitry for storing data stored within the dynamic or static random access memory in case of a power cycle.

In Example 51, the subject matter of one of the examples 41 to 50 or any of the Examples described herein may further include, that the control instruction is based on a Non-Volatile Memory Express control instruction protocol.

In Example 52, the subject matter of one of the examples 41 to 51 or any of the Examples described herein may further include, that the controller method comprises obtaining 110 one or more control instructions related to file systems of a plurality of partitions from the host computer, the plurality of partitions being at least partially stored within the storage circuitry 18 of the solid-state storage device 100, the one or more control instructions indicating a location of file system metadata within the plurality of partitions, the controller method comprising storing 120 the file system metadata within the non-volatile buffer memory circuitry 16 of the solid-state storage device 100 based on the location of the file system metadata.

In Example 53, the subject matter of example 52 or any of the Examples described herein may further include, that the plurality of partitions are associated with a plurality of namespaces of the solid-state storage device 100.

Example 54 relates to a method for a host computer, the method comprising determining 210 a location of file system metadata of a file system of a partition. The partition is at least partially being stored within a storage circuitry 18 of a solid-state storage device 100. The solid-state storage device 100 further comprises non-volatile buffer memory circuitry 16. The method comprises providing 220 a control instruction related to the file system of the partition to the solid-state storage device 100, the control instruction indicating the location of the file system metadata within the partition.

In Example 55, the subject matter of example 54 or any of the Examples described herein may further include, that the control instruction is suitable for instructing a controller of the solid-state storage device 100 to store the file system metadata of the partition within the non-volatile buffer memory circuitry 16 of the solid-state storage device 100.

In Example 56, the subject matter of example 55 or any of the Examples described herein may further include, that the method comprises accessing 230 the partition based on a logical address range of the partition, wherein one or more logical addresses of the file system metadata within the logical address range of the partition are unaffected by the storing of the file system metadata of the partition within the non-volatile buffer memory circuitry 16 of the solid-state storage device 100.

In Example 57, the subject matter of one of the examples 54 to 56 or any of the Examples described herein may further include, that the method comprises determining 210 a location of file system metadata of file system of a plurality of partitions, and providing 220 one or more control instructions related to the file systems of the plurality of partitions to the solid-state storage device 100, the plurality of partitions being at least partially stored within the storage circuitry 18 of the solid-state storage device 100, the one or more control instructions indicating a location of file system metadata within the plurality of partitions.

Example 58 relates to a circuitry 18, the solid-state storage device 100 being configured to execute the method according to one of the examples 41 to 53.

Example 59 relates to a host computer 1000 comprising the solid-state storage device 100 according to example 59.

In Example 60, the host computer of one of example 59 or any of the Examples described herein may be configured to execute the method according to one of the claims 54 to 57.

Example 61 relates to a machine readable storage medium including program code, when executed, to cause a machine to perform the method of one of the examples 41 to 53 or the method of one of the examples 54 to 57.

Example 62 relates to computer program having a program code for performing the method of one of the examples 41 to 53 or the method of one of the examples 54 to 57, when the computer program is executed on a computer, a processor, or a programmable hardware component.

Example 63 relates to a machine readable storage including machine readable instructions, when executed, to implement a method or realize an apparatus as claimed in any example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A controller apparatus for a solid-state storage device, the solid-state storage device comprising non-volatile buffer memory circuitry and storage circuitry, the controller apparatus comprising:
   interface circuitry for communicating with a host computer; and
   processing circuitry configured to:
   obtain a control instruction related to a file system of a partition from the host computer, the partition being at least partially stored within the storage circuitry of the solid-state storage device, the control instruction indicating a location of file system metadata within the partition, and
   store the file system metadata within the non-volatile buffer memory circuitry of the solid-state storage device based on the location of the file system metadata, wherein the processing circuitry is configured to change an internal mapping of the location of the file system metadata to a respective location within the non-volatile buffer memory circuitry.

2. The controller apparatus according to claim 1, wherein the processing circuitry is configured to map the location of the file system metadata to the non-volatile buffer memory circuitry.

3. The controller apparatus according to claim 2, wherein the processing circuitry is configured to map one or more logical addresses of the file system metadata to one or more physical addresses of the non-volatile buffer memory circuitry.

4. The controller apparatus according to claim 2, wherein the partition is logically divided into a plurality of logical blocks, wherein the processing circuitry is configured to map one or more logical blocks comprising the file system metadata to the non-volatile buffer memory circuitry.

5. The controller apparatus according to claim 1, wherein the processing circuitry is configured to provide access to the partition to the host computer based on a logical address range of the partition, wherein the processing circuitry is configured to map a part of the logical address range that represents the location of the file system metadata to one or more physical addresses of the non-volatile buffer memory circuitry.

6. The controller apparatus according to claim 1, wherein the file system metadata comprises at least one of a group descriptor of the file system, a data block bitmap of the file system, an inode bitmap of the file system, and an inode table of the file system.

7. The controller apparatus according to claim 1, wherein the file system metadata is stored within the non-volatile buffer memory circuitry without changing a logical address of the location of the metadata within the file system.

8. The controller apparatus according to claim 1, wherein the non-volatile buffer memory circuitry is based on persistent memory.

9. The controller apparatus according to claim 1, wherein the non-volatile buffer memory circuitry is based on phase-change memory.

10. The controller apparatus according to claim 1, wherein the non-volatile buffer memory circuitry comprises dynamic or static random access memory and circuitry for storing data stored within the dynamic or static random access memory in case of a power cycle.

11. The controller apparatus according to claim 1, wherein the control instruction is based on a Non-Volatile Memory Express control instruction protocol.

12. The controller apparatus according to claim 1, wherein the processing circuitry is configured to obtain one or more control instructions related to file systems of a plurality of partitions from the host computer, the plurality of partitions being at least partially stored within the storage circuitry of the solid-state storage device, the one or more control instructions indicating a location of file system metadata within the plurality of partitions, the processing circuitry being configured to store the file system metadata within the non-volatile buffer memory circuitry of the solid-state storage device based on the location of the file system metadata.

13. The controller apparatus according to claim 12, wherein the plurality of partitions are associated with a plurality of namespaces of the solid-state storage device.

14. An apparatus for a host computer, the apparatus comprising:
  interface circuitry for communicating with a solid-state storage device, the solid-state storage device comprising non-volatile buffer memory circuitry and storage circuitry; and
  processing circuitry configured to:
    determine a location of file system metadata of a file system of a partition, the partition at least partially being stored within the storage circuitry of the solid-state storage device, and
    provide a control instruction related to the file system of the partition to the solid-state storage device, the control instruction indicating the location of the file system metadata within the partition, wherein the file system metadata is stored within the non-volatile buffer memory circuitry of the solid-state storage device based on the location of the file system metadata and an internal mapping of the location of the file system metadata is changed in the solid-state storage device to a respective location within the non-volatile buffer memory circuitry.

15. The apparatus according to claim 14, wherein the control instruction is suitable for instructing a controller apparatus of the solid-state storage device to store the file system metadata of the partition within the non-volatile buffer memory circuitry of the solid-state storage device.

16. The apparatus according to claim 15, wherein the processing circuitry is configured to access the partition based on a logical address range of the partition, wherein one or more logical addresses of the file system metadata within the logical address range of the partition are unaffected by the storing of the file system metadata of the partition within the non-volatile buffer memory circuitry of the solid-state storage device.

17. The apparatus according to claim 14, wherein the processing circuitry is configured to determine a location of file system metadata of file system of a plurality of partitions, and to provide one or more control instructions related to the file systems of the plurality of partitions to the solid-state storage device, the plurality of partitions being at least partially stored within the storage circuitry of the solid-state storage device, the one or more control instructions indicating a location of file system metadata within the plurality of partitions.

18. A computer program having a program code for performing a controller method for a solid-state storage device, when the computer program is executed on a computer, a processor, or a programmable hardware component, the solid-state storage device comprising non-volatile buffer memory circuitry and storage circuitry, the controller method comprising:
  obtaining a control instruction related to a file system of a partition from a host computer, the partition being at least partially stored within the storage circuitry of the solid-state storage device, the control instruction indicating a location of file system metadata within the partition; and
  storing the file system metadata within the non-volatile buffer memory circuitry of the solid-state storage device based on the location of the file system metadata, wherein an internal mapping of the location of the file system metadata is changed to a respective location within the non-volatile buffer memory circuitry.

19. A computer program having a program code for performing a method for a host computer, when the computer program is executed on a computer, a processor, or a programmable hardware component, the method comprising:
  determining a location of file system metadata of a file system of a partition, the partition at least partially being stored within a storage circuitry of a solid-state storage device, the solid-state storage device further comprising non-volatile buffer memory circuitry; and
  providing a control instruction related to the file system of the partition to the solid-state storage device, the control instruction indicating the location of the file system metadata within the partition, wherein the file system metadata is stored within the non-volatile buffer memory circuitry of the solid-state storage device based on the location of the file system metadata and an internal mapping of the location of the file system metadata is changed in the solid-state storage device to a respective location within the non-volatile buffer memory circuitry.

* * * * *